United States Patent
Galasso et al.

(10) Patent No.: US 8,936,139 B2
(45) Date of Patent: Jan. 20, 2015

(54) METHODS AND APPARATUS FOR SUSPENSION ADJUSTMENT

(75) Inventors: Mario Galasso, Watsonville, CA (US); Dennis K. Wootten, Scotts Valley, CA (US); Joseph Franklin, Vancouver, WA (US)

(73) Assignee: Fox Factory, Inc., Scotts Valley, CA (US)

( * ) Notice: Subject to any disclaimer, the term of this patent is extended or adjusted under 35 U.S.C. 154(b) by 355 days.

(21) Appl. No.: 13/338,047

(22) Filed: Dec. 27, 2011

(65) Prior Publication Data

US 2012/0136537 A1    May 31, 2012

Related U.S. Application Data

(63) Continuation-in-part of application No. 13/292,949, filed on Nov. 9, 2011, and a continuation-in-part of application No. 13/022,346, filed on Feb. 7, 2011, and a continuation-in-part of application No. 12/773,671, (Continued)

(51) Int. Cl.
*F16F 9/34* (2006.01)
*F16F 9/32* (2006.01)

(52) U.S. Cl.
CPC .................................. *F16F 9/3292* (2013.01)
USPC ................. 188/322.21; 188/319.1; 188/319.2

(58) Field of Classification Search
USPC ............... 188/282.1, 282.7, 282.8, 301, 318, 188/319.1, 322.21, 319.2, 322.13; 280/6.158, 6.159
See application file for complete search history.

(56) References Cited

U.S. PATENT DOCUMENTS

| | | | | |
|---|---|---|---|---|
| 1,923,011 | A | * | 8/1933 | Moulton ........................ 188/301 |
| 3,085,530 | A | * | 4/1963 | Williamson ..................... 72/386 |
| 3,575,442 | A | * | 4/1971 | Elliott et al. ................. 280/6.159 |
| 3,784,228 | A | * | 1/1974 | Hoffmann et al. .......... 280/6.158 |
| 4,655,440 | A | * | 4/1987 | Eckert ......................... 267/64.11 |
| 4,732,244 | A | * | 3/1988 | Verkuylen ..................... 188/318 |
| 4,773,671 | A | | 9/1988 | Inagaki |
| 4,830,395 | A | * | 5/1989 | Foley ...................... 280/124.162 |
| 4,949,989 | A | | 8/1990 | Kakizaki et al. |
| 4,984,819 | A | | 1/1991 | Kakizaki et al. |
| 5,027,303 | A | | 6/1991 | Witte |
| 5,044,614 | A | | 9/1991 | Rau |

(Continued)

FOREIGN PATENT DOCUMENTS

| | | |
|---|---|---|
| EP | 0 304 801 A2 | 3/1989 |
| EP | 1 355 209 A1 | 10/2003 |

(Continued)

*Primary Examiner* — Christopher Schwartz
(74) *Attorney, Agent, or Firm* — Patterson & Sheridan, L.L.P.; David M. Haugen

(57) ABSTRACT

A shock absorber includes a gas spring cylinder containing a piston moveable between an extended position and a compressed position within the gas spring cylinder. A mechanical actuator is arranged whereby a bleed port is automatically closed when the gas spring is compressed to a predetermined position corresponding to a desired sag setting. In one embodiment, the position corresponds to a predetermined sag setting whereby the gas spring is partially compressed. In another embodiment, a proper sag setting is determined through the use of a processor and sensor that in one instance measure a position of shock absorber components to dictate a proper sag setting and in another instance calculate a pressure corresponding to a preferred sag setting.

4 Claims, 8 Drawing Sheets

Related U.S. Application Data filed on May 4, 2010, and a continuation-in-part of application No. 12/727,915, filed on Mar. 19, 2010.

(60) Provisional application No. 61/427,438, filed on Dec. 27, 2010, provisional application No. 61/533,712, filed on Sep. 12, 2011, provisional application No. 61/411,901, filed on Nov. 9, 2010, provisional application No. 61/302,070, filed on Feb. 5, 2010, provisional application No. 61/175,422, filed on May 4, 2009, provisional application No. 61/161,552, filed on Mar. 19, 2009, provisional application No. 61/161,620, filed on Mar. 19, 2009.

(56) References Cited

U.S. PATENT DOCUMENTS

| | | | |
|---|---|---|---|
| 5,094,325 A * | 3/1992 | Smith | 188/282.1 |
| 5,105,918 A | 4/1992 | Hagiwara et al. | |
| 5,152,547 A | 10/1992 | Davis | |
| 5,390,949 A | 2/1995 | Naganathan et al. | |
| 5,553,836 A | 9/1996 | Ericson | |
| 5,803,443 A | 9/1998 | Chang | |
| 5,971,116 A | 10/1999 | Franklin | |
| 6,017,047 A * | 1/2000 | Hoose | 280/276 |
| 6,073,736 A | 6/2000 | Franklin | |
| 6,135,434 A | 10/2000 | Marking | |
| 6,244,398 B1 | 6/2001 | Girvin et al. | |
| 6,311,962 B1 | 11/2001 | Marking | |
| 6,360,857 B1 | 3/2002 | Fox et al. | |
| 6,427,812 B2 | 8/2002 | Crawley et al. | |
| 6,434,460 B1 | 8/2002 | Uchino et al. | |
| 6,592,136 B2 | 7/2003 | Becker et al. | |
| 6,863,291 B2 | 3/2005 | Miyoshi | |
| 6,935,157 B2 | 8/2005 | Miller | |
| 7,163,222 B2 | 1/2007 | Becker et al. | |
| 7,287,760 B1 | 10/2007 | Quick et al. | |
| 7,293,764 B2 | 11/2007 | Fang | |
| 7,374,028 B2 | 5/2008 | Fox | |
| 7,703,585 B2 * | 4/2010 | Fox | 188/299.1 |
| 8,622,180 B2 * | 1/2014 | Wootten et al. | 188/278 |
| 8,763,770 B2 * | 7/2014 | Marking | 188/274 |
| 2006/0185951 A1* | 8/2006 | Tanaka | 188/322.13 |
| 2009/0236807 A1 | 9/2009 | Wootten et al. | |
| 2010/0044975 A1 | 2/2010 | Yablon et al. | |
| 2010/0244340 A1 | 9/2010 | Wootten et al. | |
| 2010/0252972 A1 | 10/2010 | Cox et al. | |
| 2010/0276906 A1 | 11/2010 | Galasso et al. | |

FOREIGN PATENT DOCUMENTS

| | | |
|---|---|---|
| JP | 57-173632 | 10/1982 |
| JP | 57-182506 | 11/1982 |
| WO | WO 99/06231 | 2/1999 |

* cited by examiner

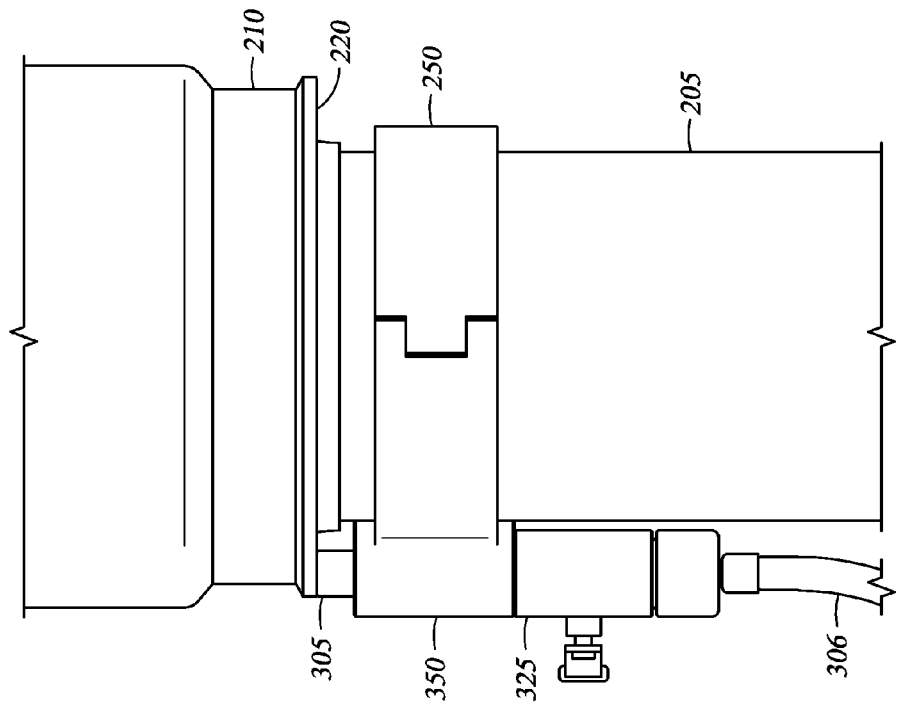
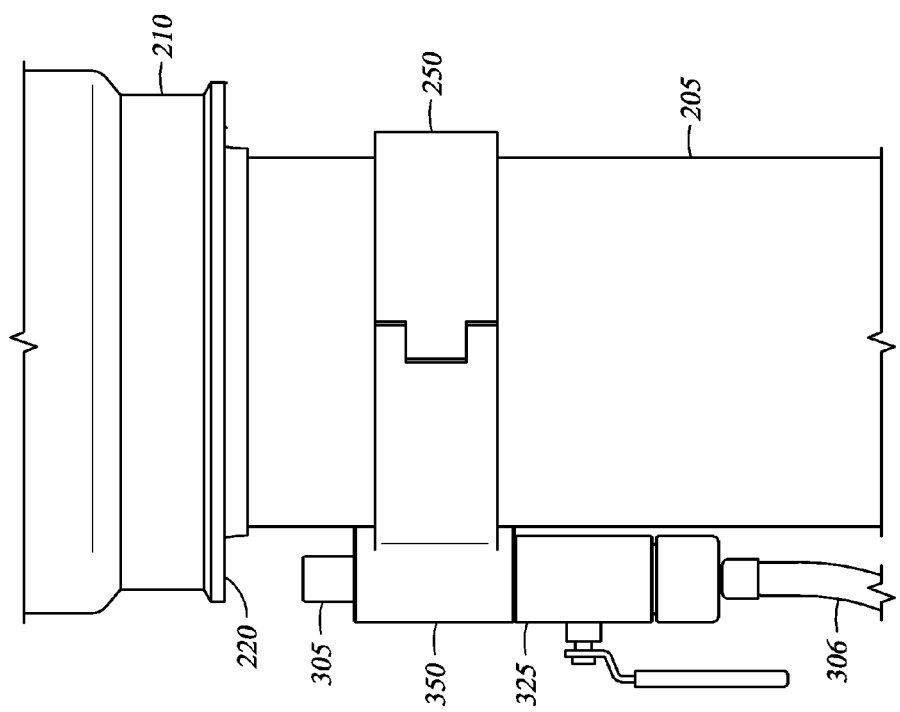

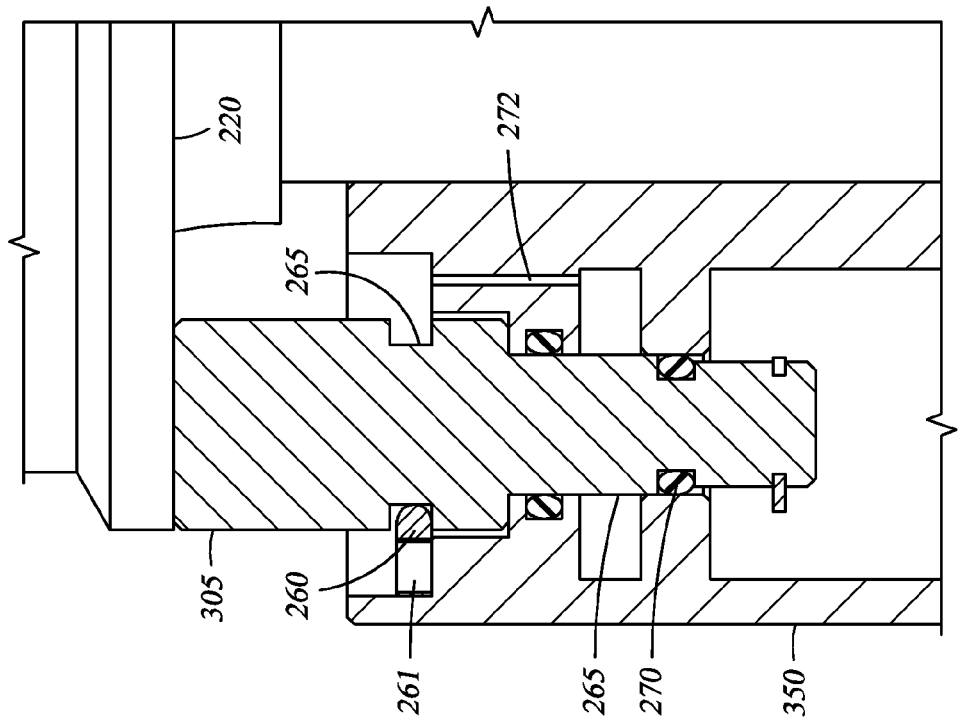
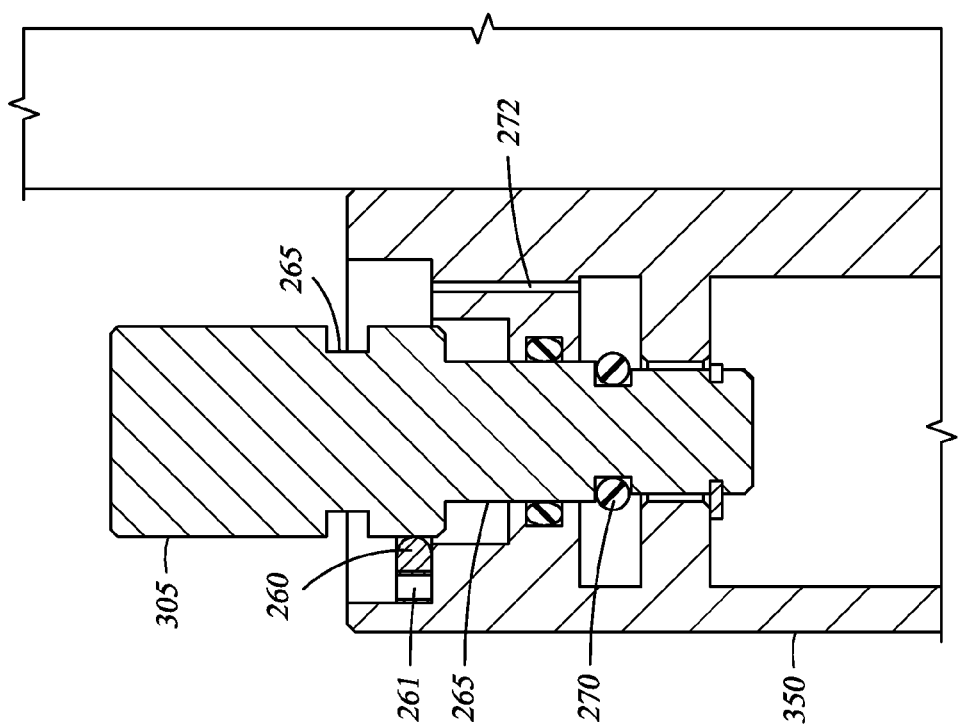
Fig. 5A
Fig. 5B

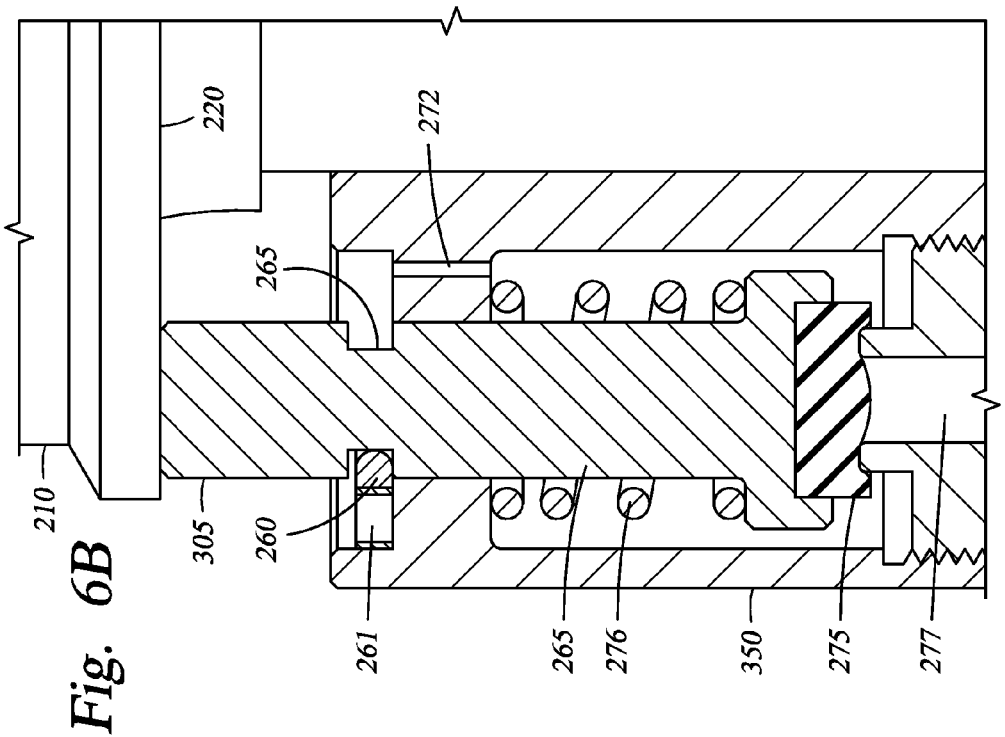
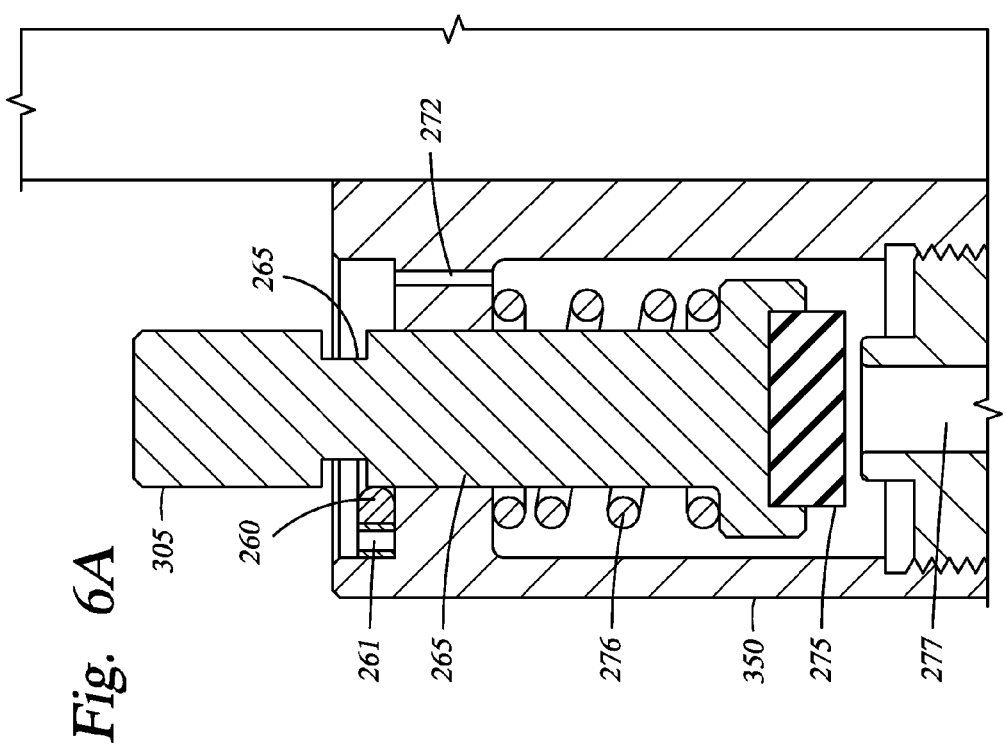

METHODS AND APPARATUS FOR SUSPENSION ADJUSTMENT

CROSS-REFERENCE TO RELATED APPLICATIONS

This application claims benefit of U.S. Provisional Patent Application Ser. No. 61/427,438, filed Dec. 27, 2010, and claims benefit of U.S. Provisional Patent Application Ser. No. 61/533,712, filed Sep. 12, 2011, both of which are herein incorporated by reference in their entireties.

This application is also a continuation-in-part of U.S. patent application Ser. No. 13/292,949, filed Nov. 9, 2011, which claims benefit of U.S. Provisional Patent Application Ser. No. 61/411,901, filed Nov. 9, 2010, both of which are herein incorporated by reference in their entireties.

This application is also a continuation-in-part of U.S. patent application Ser. No. 13/022,346, filed Feb. 7, 2011, which claims benefit of U.S. Provisional Patent Application Ser. No. 61/302,070, filed Feb. 5, 2010, both of which are herein incorporated by reference in their entireties.

This application is also a continuation-in-part of U.S. patent application Ser. No. 12/773,671, filed May 4, 2010, which claims the benefit of U.S. Provisional Application Ser. No. 61/175,422, filed May 4, 2009, both of which are herein incorporated by reference in their entireties.

This application is also a continuation-in-part of U.S. patent application Ser. No. 12/727,915, filed Mar. 19, 2010, which claims benefit of U.S. Provisional Patent Application Ser. No. 61/161,552, filed Mar. 19, 2009, and U.S. Provisional Patent Application Ser. No. 61/161,620, filed Mar. 19, 2009, each of which are herein incorporated by reference in their entireties.

BACKGROUND OF THE INVENTION

1. Field of the Invention

The invention relates generally to vehicle suspensions and, more specifically, to methods and apparatus for suspension adjustment.

2. Description of the Related Art

Vehicle suspension systems typically include some form of a shock absorber. Many integrated damper/spring shock absorbers include a damper body surrounded by a mechanical spring. The damper body often consists of a vented piston and a shaft telescopically mounted in a fluid cylinder. Some shock absorbers utilize gas as a spring medium in place of, or in addition to, a mechanical spring. The spring rate of such shock absorbers may be adjustable such as by adjusting the preload of a mechanical spring or adjusting the pressure of the gas in the shock absorber. In that way the shock absorber can be adjusted to accommodate heavier or lighter carried weight, or greater or lesser anticipated impact loads. In vehicle applications, including motorcycles, bicycles, and, particularly, off-road applications, shock absorbers are pre-adjusted to account for varying terrain and anticipated speeds and jumps. Shocks are also adjusted according to certain rider preferences (e.g. soft-firm).

One disadvantage with conventional shock absorbers is that adjusting the spring mechanism to the correct preset may be difficult. The vehicle must be properly loaded for the expected riding conditions such as with a rider or driver sitting on or in the vehicle while the spring mechanism is adjusted to create a proper amount of preload. Often times such adjustment requires both a rider sitting on the vehicle and a separate mechanic performing the proper adjustment at the location of the shock absorber. A further disadvantage is that many current systems rely on imprecise tools and methods to set the initial amount of preload.

As the foregoing illustrates, what is needed in the art are improved apparatus and techniques for easily and accurately adjusting the amount of preload applied to a spring in a shock absorber.

SUMMARY OF THE INVENTION

One embodiment of the present disclosure sets forth a shock absorber that includes a gas spring cylinder containing a piston. The piston is moveable between an extended position and a compressed position within the gas spring cylinder. A fill port is fluidly coupled to the cylinder and configured to enable gas to be added to the cylinder, and, in addition, a bleed port is provided to bleed a predetermined amount of gas from the cylinder. A mechanical actuator is arranged whereby the bleed port is automatically closed when the gas spring is compressed to a predetermined position corresponding to a desired sag setting. Another embodiment sets forth a vehicle suspension system that includes the shock absorber discussed above. The vehicle suspension system may also include a front bicycle or motorcycle (for example) fork incorporating the described elements of the shock absorber.

Yet another embodiment sets forth a method for adjusting a vehicle suspension. The method includes the steps of pressurizing a gas spring cylinder of a shock absorber, loading the vehicle suspension with an expected operating load, bleeding air from the cylinder through a bleed port/valve until a first portion of the suspension reaches a predetermined position relative to another portion of the suspension. The position corresponds to a predetermined sag setting whereby the gas spring is partially compressed.

In yet another embodiment, a proper sag setting is determined through the use of a processor and sensor that in one instance measure a position of shock absorber components to dictate a proper sag setting and in another instance calculate a pressure corresponding to a preferred sag setting.

BRIEF DESCRIPTION OF THE DRAWINGS

FIG. 3A is a sectional side view of a bleed valve in an open position and 3B illustrates the valve of 3A in a closed position;

FIG. 4A illustrates a retention member in a closed position while 4B illustrates the member in an open position;

FIG. 5A is a sectional side view of a bleed valve in an open position and 5B illustrates the valve of 5A in a closed position;

FIG. 6A is a sectional side view of a bleed valve in an open position and 6B illustrates the valve of 6A in a closed position;

DETAILED DESCRIPTION

Figure 1:
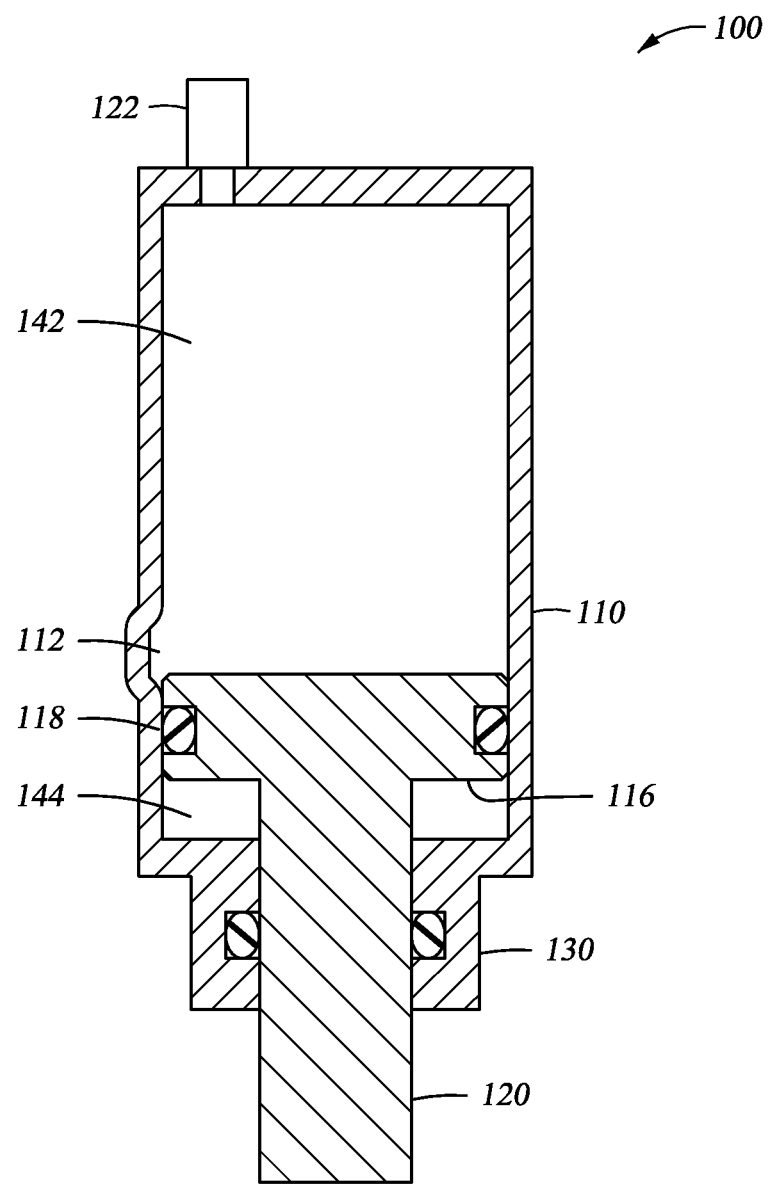
FIG. 1 is a schematic illustration of a gas spring shock absorber.

This Patent Application is related to U.S. patent application Ser. No. 12/773,671; U.S. Provisional Patent Application Ser.

No. 61/175,422 ("'422"); U.S. Provisional Patent Application Ser. No. 61/302,070; and U.S. Provisional Patent Application Ser. No. 61/411,901; each of which is entirely incorporated herein by reference. Any individual feature or combination of the features disclosed in the foregoing incorporated references may be suitable for combination with embodiments of this present disclosure.

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

Some shock absorbers utilize gas as a spring medium in place of, or in addition to, mechanical springs. Gas spring type shock absorbers, having integral dampers, are described in U.S. Pat. Nos. 6,135,434; 6,360,857 and 6,311,962; each of which is herein incorporated, in its entirety, by reference. U.S. Pat. No. 6,360,857 shows a shock absorber having selectively adjustable damping characteristics. U.S. Pat. No. 7,163,222, which is incorporated herein, in its entirety, by reference, describes a gas sprung front shock absorber for a bicycle (a "fork") having a selective "lock out" and adjustable "blow off" function.

The spring mechanism (gas or mechanical) of some shock absorbers is adjustable so that it can be preset to varying initial states of compression. In some instances the shock spring (gas or mechanical) may comprise different stages having varying spring rates, thereby giving the overall shock absorber a compound spring rate depending varying through the stroke length. In that way the shock absorber can be adjusted to accommodate heavier or lighter carried weight, or greater or lesser anticipated impact loads. In vehicle applications including motorcycle and bicycle applications and particularly off-road applications, shock absorbers are pre-adjusted to account for varying terrain and anticipated speeds and jumps. Shocks are also adjusted according to certain rider preferences (e.g. soft-firm).

A representative embodiment of a shock absorber derives from a modification, as disclosed herein, of the shock absorber shown in FIG. 28 of, and elsewhere in, U.S. Pat. No. 7,374,028 (the "'028" patent) which is incorporated herein by reference. The term "negative spring" or "negative biasing element" may be better understood by reference to U.S. Pat. Nos. 6,135,434; 6,311,962; and/or 6,105,988; each of which is entirely incorporated herein by reference.

It is noted that embodiments herein of shock absorber adjustment systems and methods are equally applicable to a vehicle's (such as bicycle or motorcycle) front forks. Further, it is contemplated that such a bicycle or motorcycle may include both shock absorber and fork, both of which benefiting from some or all of the features disclosed herein.

An important initial setting to get correct is suspension "sag." Suspension sag is the measured distance a shock compresses while the rider, wearing intended riding gear, is seated on (for example) a bicycle or motorcycle in a riding position, versus its fully extended position (sag also applies to ATVs, trucks and other suspension equipped vehicles and may account for not only the driver weight but other operational payload weight as well). Getting the sag correct sets the front end steering/handling geometry, puts the rear suspension at its intended linkage articulation for pedaling or riding efficiency (if applicable) and bump absorption and provides some initial suspension compression to allow the wheels/ suspension to react to negative terrain features (e.g. dips requiring suspension extension) without having the entire vehicle "fall" into those features. Proper sag adjustment is critical in ensuring continuous contact between tire and ground and greatly enhances traction over varied terrain. Often any attention that is paid to this initial sag setting is focused on the rear suspension, especially in motorcycle applications, but making sure that both the front and rear sag settings are correct are equally important. In one embodiment each suspension component is equipped with a position sensor (e.g. electronic or mechanical) for indicating the magnitude (or state) of extension or compression existing in the suspension. In one embodiment such state of extension or compression is determined by calculation based on a related parameter of the suspension.

A negative spring is used in conjunction with a primary gas spring to create a force equilibrium at zero stroke. If a gas spring is used with no negative spring, the static gas spring force will have to be overcome before the fork or shock will move. For a 1 in^2 piston area and a 100 pis charged gas spring (and including seal break away force), it would take significantly more than 100 lbs of force to get the fork or shock to begin to move. Such high initial force requirement results in a fairly harsh suspension. A negative spring pulls the initial force to move the fork or shock down to, or close to zero. This effect can also be calculated depending on whether the negative spring is a gas spring itself, or a coil spring.

U.S. Pat. No. 6,135,434 ("'434 patent"), which is entirely incorporated herein by reference, discloses (see FIGS. 3, 4 and 5 and descriptions thereof) an integral gas spring and damper type shock absorber including a negative gas spring 64 and a bypass port or channel 66. As described in the '434 patent, the axial location of the bypass channel is important in properly setting the negative spring pressure versus the main gas spring pressure throughout the shock stroke.

FIG. 1 is a schematic illustration of a gas or "air" spring shock absorber 100, according to one example embodiment. As shown in FIG. 1, the gas spring shock absorber 100 includes a gas cylinder 110 and a piston rod 120 connected to a piston 116 that is telescopically housed within the gas cylinder 110. The piston rod 120 passes through a sealed head 130 of the shock absorber 100. The piston 116 reciprocates in the cylinder body and is sealed against an inner surface of the cylinder body via a sealing element 118 (e.g., an o-ring) preventing gas from a positive gas spring 142 from flowing into a negative gas spring 144. As the piston rod 120 is forced into the gas spring shock absorber 100, the piston 116 moves into the gas cylinder 110 and compresses the gas in the positive gas spring 142 thereby resisting the motion of the piston rod 120 as the volume of the positive gas spring 142 decreases. Similarly, as the piston rod 120 is extracted from the gas cylinder 110, the piston 116 moves towards the sealed head 130 of the gas cylinder 110 and compresses the negative gas spring 144 resisting motion of the piston rod 120 as the shock absorber 100 approaches the fully extended position.

In one embodiment a shock absorber like the one shown in FIG. 1 may be connected to a rear linkage of a bicycle (but would normally include an integral damper as well). In order to charge the positive gas spring 142, gas is pumped into the gas cylinder 110 via a fill valve 122. Fill valve 122 comprises a Schrader type valve such as commonly used with bicycle tubes. Alternatively, fill valve 122 may be some other pneumatic type valve well-known to those of skill in the art. Gas is continually added (e.g., by means of a pump or air compressor) to the gas cylinder 110 via fill valve 122 such that the pressure within the positive gas spring 142 increases and forces the piston 116 towards the sealed head 130 of the shock absorber 100. Gas is added until the pressure in the positive gas spring 142 reaches a maximum pressure P1 (e.g., 300 psi) that is one beyond a reasonably anticipated operating pressure but still below any structural pressure limitations of the gas cylinder 110. Fill valve 122 may then be closed, sealing the gas inside the gas cylinder 110. Gas cylinder 110 also includes a bypass channel 112 located a fixed distance DB from the sealed head 130 of the shock absorber 100. Bypass channel may be a dimple in the side of gas cylinder 110 configured such that when piston 116 is located at the distance DB within the stroke, gas from the positive gas spring 142 may flow freely to the negative gas spring 144, thereby equalizing the pressure on both sides of piston 116. As piston 116 moves below the bypass channel 112, the pressure in the negative gas spring 144 will be greater than the pressure in the positive gas spring 142, applying a force on the piston 116 away from the sealed head 130 of the shock absorber 100. Conversely, as piston 116 moves above the bypass channel 112, the pressure in the negative gas spring 144 will be less than the pressure in the positive gas spring 142, applying a force on the piston 116 toward the sealed head 130 of the shock absorber 100.

A gas spring typically has a non-linear spring rate because (simply stated and ignoring thermal and other effects) of the ideal gas law derived principle of $P1V1=P2V2$ (where P is pressure and V is volume and 1 is an initial state and 2 is a second state of a closed system). A volume change occurs with each increment of linear piston stroke. Increments of V required to effect spring force change get smaller as axial compression continues as P doubles for every $½V$ (i.e. ½ reduction of the total remaining volume at any time will double the pressure over the unreduced remaining volume at the time) change. In other words, each 2P change is happening for a constantly decreasing amount of linear stroke hence volume (e.g. logarithmic). This causes an increasing spring rate with gas spring compression.

In one embodiment, initial sag can be automatically set and facilitated by having a position valve attached to the shock absorber such that the position valve allows main gas spring bleed off to occur until a specific sag level is achieved at which time the valve is closed. Each shock absorber has a specific stroke length and proper sag is typically a predetermined fraction of that stroke. In one embodiment the position valve is attached to a fully extended shock absorber such that a plunger or trigger of the valve causes the valve to close at a predetermined distance into the stroke, under load, from full extension.

Figure 2:
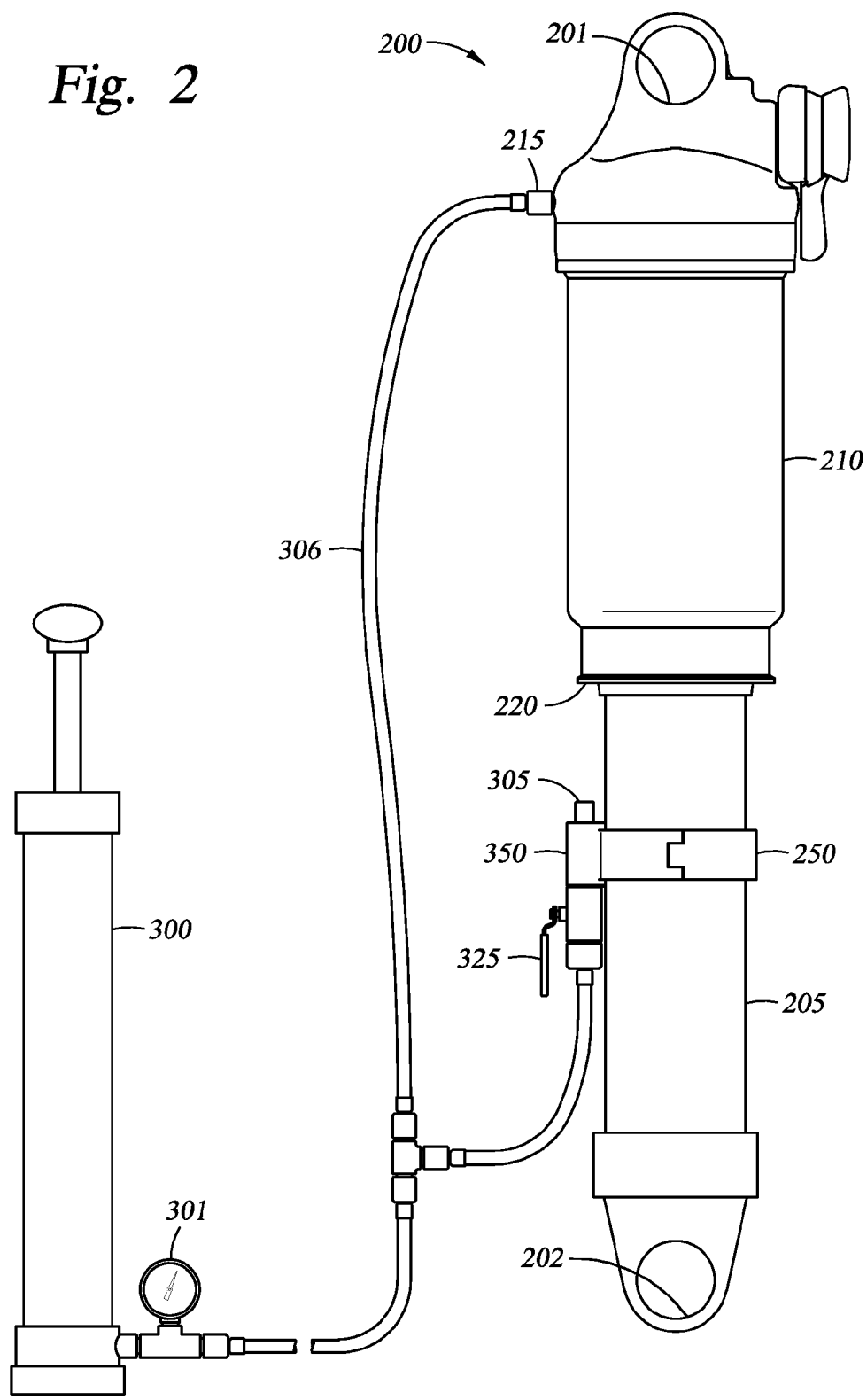
FIG. 2 is a side view of a shock absorber assembly including a hand operated air pump for use with a gas spring portion of the shock.

In one embodiment, as shown in FIG. 2, a shock absorber 200 includes a damping body 205 telescopically arranged within a gas spring body 210. Eyelets at an upper 201 and lower 202 ends of the shock absorber permit attachment to separate portions of a vehicle. The shock of FIG. 2 would typically be used at the rear of a bike or other vehicle but the principles and embodiments described herein are equally usable with front suspensions such as front forks. During compression of the shock absorber 200, the damping body 205 will travel further inside of the gas spring body 210 and hence the exposed length of the damping body will decrease. In FIG. 2, the damping body 205 is shown in a fully extended position. A hand operated (or automated electric for example) air pump 300 includes a hose 306 extending therefrom. A gauge 301 displays the measurement of pressure delivered by the pump. The hose has a T-junction 310 with a first portion connected to a fill valve 215, like a Schrader valve, of the gas spring portion of the shock absorber 200 and a second end terminates, in one embodiment, at a plunger operated bleed valve 350 affixed to a bracket 220. The plunger, as will be disclosed herein operates as a "trigger" to shift the bleed valve between an "open" and a "closed" positions. The plunger 305 has an operational axis that is substantially parallel to the longitudinal axis of the damper body 205 and is arranged whereby the valve 350 is open when a plunger 305 mounted at an upper portion thereof is extended and closed when the plunger is depressed. In one embodiment, the plunger head is directed toward a shoulder 220 of the gas spring body 205 such that sufficient movement of the damper body into the gas spring body 210 during shock compression will cause the head of the plunger 305 to impact the shoulder 220, thereby depressing the plunger and closing a bleed valve.

In one embodiment shown in FIGS. 2 through 4, a sag mode valve 325 is located functionally between an output end of the pump 300 and the plunger operated bleed valve 350. In use, the mode valve 325 is closed when initially pressurizing the gas spring of the shock absorber through the fitting 215 (for example to a higher than anticipated desired operating pressure). Subsequently, the mode valve 325 is opened once a rider is seated on a vehicle having the shock absorber mounted thereon, so that the gas spring may bleed off through the normally open bleed valve 350 until the plunger valve impacts the gas spring body shoulder 220 (see also FIGS. 3A, 3B) thereby stopping the sag bleed process. In use, the bracket 250 is mounted such that the plunger 305 of valve 350 is located a distance from the shoulder 220 of the gas spring body 210 corresponding to the desired initial sag travel (e.g. ¼ or ⅓ of total travel). As air is bled from the gas spring through the plunger valve 350, the damper body 205 moves further into the gas spring body 210 until the proper sag distance has been traversed and the plunger valve 350 is correspondingly closed and the gas spring contains the proper operating pressure for the given initial load condition. The shock absorber of FIG. 2 is shown in an extended position and may be mounted to the rear linkage of a bicycle for operation. FIG. 3A is an enlarged view of the shock absorber of FIG. 2 and shows the bleed valve in an open position. FIG. 3B illustrates the valve of 3A in a closed position, the plunger 305 of the bleed valve 350 having been depressed by shoulder 220 as the gas spring reaches its preferred sag position. In use, the gas spring is initially pressurized above a reasonably anticipated operating pressure through the fill valve 122.

Figure 4A:
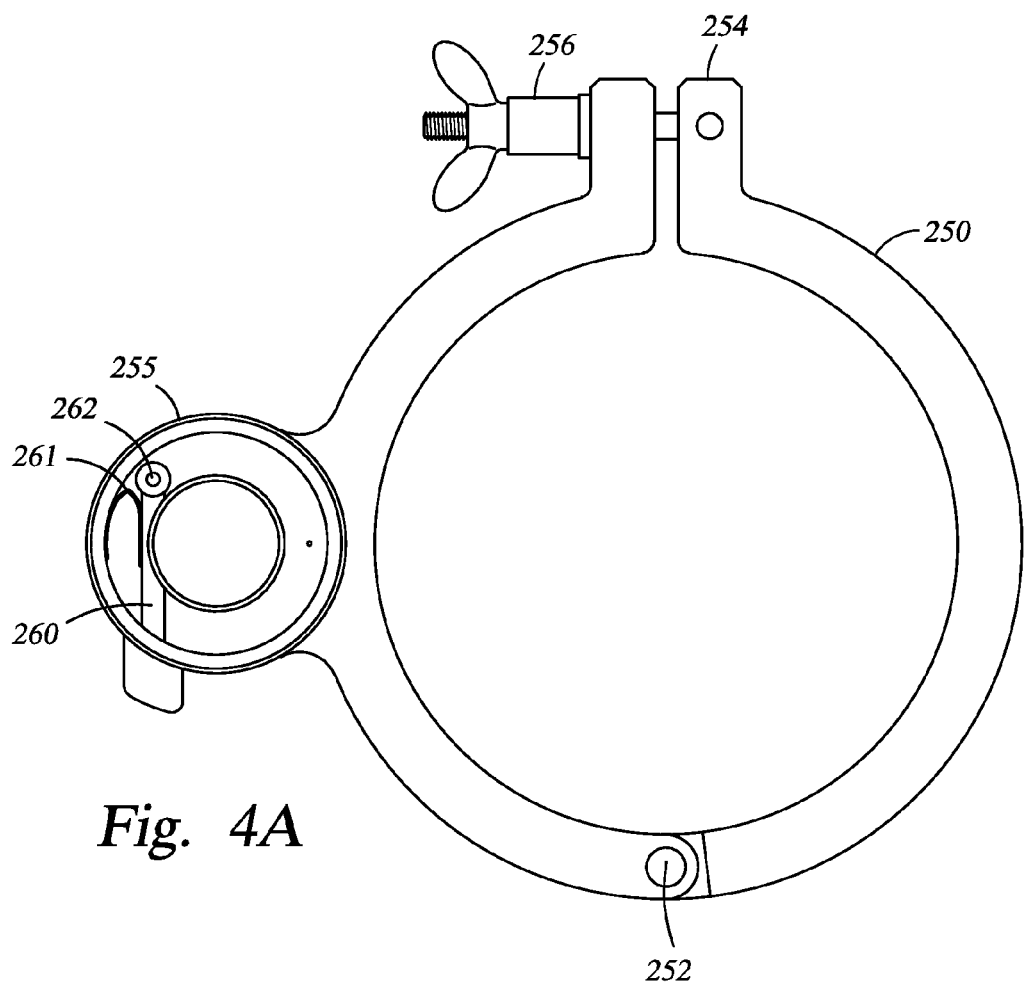
FIGS. 4A and 4B are views of a bleed valve bracket for retaining a bleed valve in a position relative to the shock absorber.
Figure 4B:
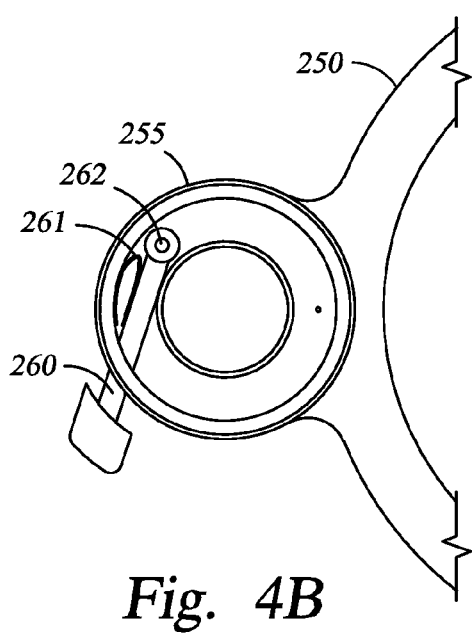

One embodiment of the bleed valve bracket 250 is illustrated in FIGS. 4A and 4B. The bracket is mountable on the damper body 205 due to a hinge 252 located on one side thereof and having a latch 254 on an opposing side. A simple fastening member 256 holds the bracket in a circular shape and is used to tighten it around the damper body 205 as shown in FIG. 2. The bleed valve 350 is mounted in a holder 255 formed on an exterior of the bracket 250 and positioned so that the bleed valve plunger 305 will be aligned with a shoulder 220 of the gas spring body (FIGS. 3A, 3B). Also visible in the bleed valve holder 225 is a retention member 260 that is designed to retain the plunger 305 of the bleed valve 350 in a depressed or closed position in order to prevent additional bleed of pressure through the valve 350 after a sag position has been established. The retention member 260 is spring biased by spring member 261 and rotatable about an end point 262 towards the center of the holder 255 to engage a reduced diameter portion 265 of the plunger 305, thereby preventing the plunger from moving axially. The plunger 305 itself is not visible in FIGS. 4A, 4B but is shown in FIGS. 5A and 5B where the reduced diameter portion 265 of the plunger 305 is visible along with the retention member 260 and its position relative to the plunger 305. In FIG. 5A for example, the plunger is in an extended position (bleed valve open) and in FIG. 5B the plunger is in a depressed position (closed) with the retention member 260 seated in the reduced diameter portion 265 of the plunger.

In one embodiment, the bleed valve 350 may be configured as shown in FIGS. 5A and B. FIG. 5A shows the valve in a "normally" open position (whereby bleed may occur) with an o-ring 270 unseated and the head of plunger 305 extended from valve body. In this position, gas pressure within the hose leaks past o-ring 270 and bleeds out through an aperture 272 that controls leak rate. FIG. 5B shows the bleed valve 350 in a closed position as would be consistent with impact of the plunger 305 against a shoulder 220 of a gas spring body. In the closed position, the o-ring 270 is seated and thereby seals the gas pressure in the hose from further leakage or bleed through the valve 350. As described above, the bleed valve can be retained in the closed position due to the position of the retention member 260 relative to the reduced diameter portion 265 as shown in FIG. 5B.

In one embodiment, the bleed valve 350 may be configured as shown in FIGS. 6A and B. FIG. 6 A shows a plunger 305 having a face seal 275 affixed at a lower end. The plunger is held by a spring 276 in a slightly biased manner toward a channel 277 for compressed gas from hose 306 (not shown). As shown in FIG. 6A, the plunger remains open due to gas pressure against the face seal 275 that overcomes the bias of the spring 276. Unless the plunger 305 is physically depressed, gas pressure may leak from the hose valve via aperture 272 by merely overcoming the force of the spring 276. FIG. 6B shows the plunger 305 in a depressed position due to contact with shoulder 220 of gas spring body 210 whereby the face seal 275 is sealed against an opening of channel 277, thereby blocking pressure bleed from the valve 350. As with the embodiment of FIGS. 5A, and B, a retention member 260 and reduced diameter portion 265 operate to retain the bleed valve in a closed position, thereby preventing additional gas from bleeding after the preferred sag position has been attained.

Figure 7B:
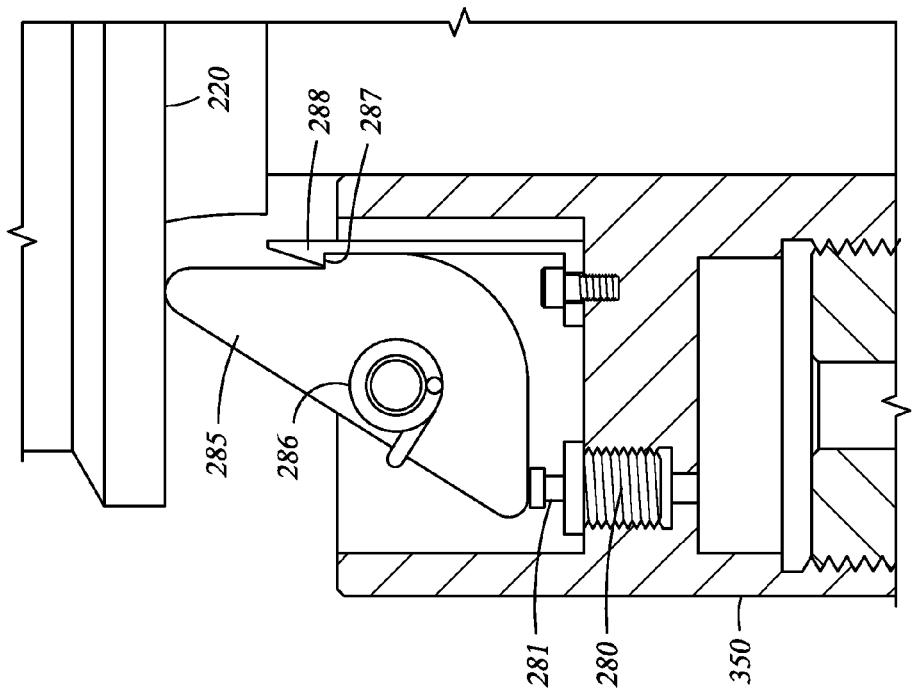
FIG. 7A is a sectional side view of a bleed valve in a closed position and 7B illustrates the valve of 7A in an open position.
Figure 7A:
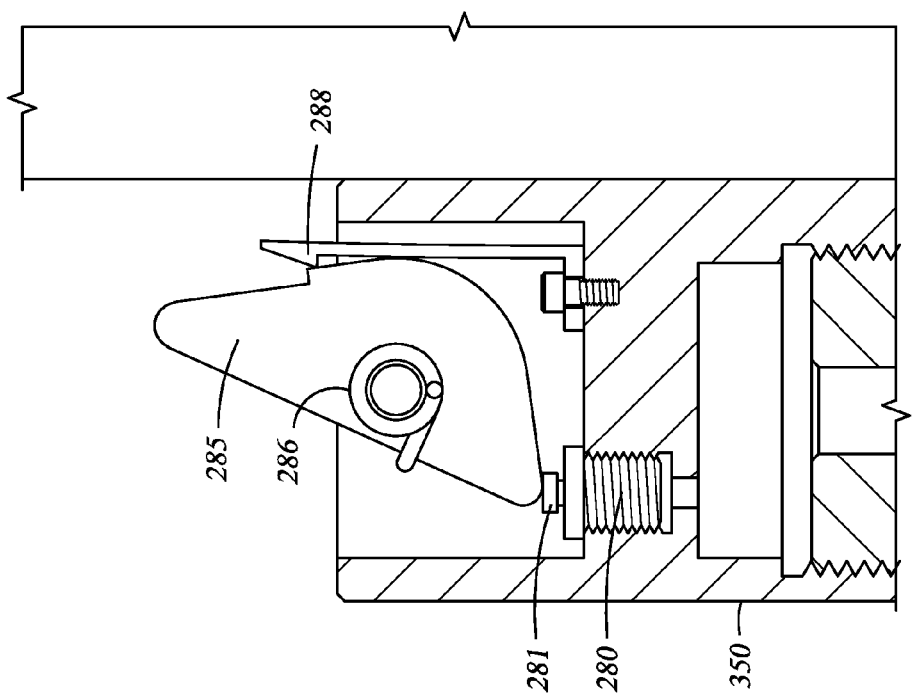

FIGS. 7A and 7B show a bleed valve 350 utilizing, for example, a standard Schrader type valve 280 in conjunction with a lever arm 285 that holds a valve stem 281 of the Schrader valve 280 in a down, hence open, position until such time that the arm 285 is levered off of the valve stem by an encounter with a shoulder 220 of the gas spring body. The arm 285 is biased by a helical or torsion spring 286 toward the Schrader valve stem 281 thus toward holding the valve in an open position to allow bleed pressure to flow from the hose and through the valve. As shown in FIG. 7B, when the arm 285 is impacted by a shoulder 220 of the gas spring body 210, the spring 286 is overcome and the Schrader valve stem 281 is released, thereby closing the valve 350. Also shown in FIG. 7B, a cut-out portion 287 of the arm 285 becomes captured under a spring steel latch 288 at full sag travel and the Schrader valve 280 therefore remains closed until the arm 285 is manually released from the latch 288.

In each of the forgoing embodiments, the gas spring part of the shock is initially pressurized by an external source of air. The air arrives via an exemplary hand pump 300 but it could be supplied by any powered or manual type pump, compressor, or even by a portable pre-charged gas cartridge. During the initial pressurization of the gas spring, the sag mode valve 325 is closed to override the bleed valve 350 and prevent operation thereof. Once the pressurization is complete, a rider's weight is placed on (or "in") the vehicle and the sag mode valve is opened. Thereafter, the bleed valve (which in each case is initially "open") permits additional compression of the shock until a predetermined travel point at which a shoulder of one portion of the compressing shock interferes with a valve member and closes the bleed valve, thereby stopping the compression travel at a predetermined sag point. At this point, the bleed valve will typically be locked out using a retention member or second valve similar to the ones disclosed in relation to the embodiments described.

In one embodiment, a preferable initial gas spring pressure P1 is determined by loading the air spring with a rider's weight (and/or other payload weight) and measuring the pressure developed in the gas spring in its loaded state. Assuming the gas spring has a constant piston area through the relevant portion of its travel (e.g. extended and loaded) that "loaded" pressure will correspond to the sag pressure because it is the pressure at which the gas spring balances the operational load. Thereafter, using a (computer) processor and a variation of gas law equation such as $P_iV_i=P_sV_s$, (where "i" is initial and "s" is sag) an initial pressure Pi can be calculated that will result in the sag pressure being reached at a desired axial location along the stroke of the shock. In one embodiment for example a proper sag compression stroke setting may be in the range of 20-25% of the total available suspension stroke. In this embodiment, an initial sag position is determined by placing a rider on (or "in") the vehicle under a static condition and permitting the shock to compress. That pressure will be Psag (even if compression is complete at a less than desirable location along the stroke of the shock). Once Psag and a desired "sag fraction" (sag portion of the total available stroke) are known, along with the initial volume and volume per incremental length of the gas spring, an initial pressure requirement Pi can be calculated to result in that sag fraction using (from $P_i=P_s \times V_s/V_i$) the formula: $P_i=P_{sag} \times (1-\text{sag fraction})$. If for example, desired sag fraction is ¼ or 25% and Psag is measured at 200 psi, the equation becomes: $P_i=200 \times (1-0.25)$. The calculation results in a Pi of 150 psi.

In practice, the forgoing operation of determining Pi may be performed in these steps:
1) The shock absorber physical dimensions (e.g. gas spring internal diameters and axial travel limits) are stored and parameters specific to the given gas spring are calculated including extended (full stroke out) gas spring volume and volume per incremental axial stroke.
2) The gas spring is initially pressurized at least high enough to avoid a bottom out condition it is loaded with a rider's weight but preferably higher not exceed maximum operating pressure;
3) with a rider or operational load on the vehicle (e.g. bike), Psag is measured to establish the pressure equilibrium based upon, among other factors, the rider's weight;
4) (optional) The desired sag fraction may be used in conjunction with calculated volume per incremental stroke to calculate a sag volume Vs corresponding to the desired sag stroke fraction
5) with the ideal sag fraction known (e.g. as desired by the user or recommended by manufacturer), the initial pressure is calculated using the formula $P_i=P_{sag} \times (1-\text{sag fraction}$ expressed as portion of axial stroke taken up by sag).
6) thereafter, the air shock is inflated to pressure Pi.

In one version of the forgoing embodiment, an automated pump is connected to the shock absorber main spring fitting and total sprung weight (including rider) is applied to the vehicle. The pump measures the equilibrium pressure Psag and then calculates a proper initial shock spring pressure generally from the formula $P_i=P_{sag} \times [1-\text{sag fraction}]$. The pump, by means of for example a screen type display, shows the user the suggested value for Pi initial and the user then uses the pump to correspondingly adjust the pressure state of the uncompressed shock absorber (after the rider has dismounted). In one embodiment, the pump automatically adjusts the uncompressed shock pressure (following dismount of the rider) by automatically operating (all the while connected to a gas input of the gas spring) until the gas spring contains the calculated Pi as measured by the pump. In one embodiment the pump is equipped with control buttons or a touch screen having press-able icons signaling the pump (when appropriately depressed by the user) that the shock is fully extended, in an equilibrium sag state, or other suitable condition. In one embodiment the pump communicates (e.g. Bluetooth, ANT Plus) information to a "smart phone" or other personal digital assistant or laptop or pad and the screen of such device acts as the user interface. In one embodiment the screen prompts the user to: connect the pump to the gas spring; pump the gas spring to overpressure; and load the vehicle, following which the screen displays the sag pressure and then instructs the user to adjust unloaded air pressure to Pi (a suggested value is displayed).

In one embodiment an optical sensor can be used to aid in setting sag. For example a digital camera such as that found on a cell phone, in conjunction with the use of the computing power of the cell phone, may be used. For example, there are a number of currently available applications (iPhoto Measurement, for example) for "smart phones" that permit measurements to be calculated from two digital images of the same object. The ideal gas derivate $PiVi=PsagVsag$ applies. In the case of a camera (e.g. on a phone), a digital image is taken and stored, of the shock in a fully extended position and a second digital image is taken and stored, of the shock subject to full sprung load (e.g. rider) or Dsag ("sag distance"). The camera is also equipped to read an optical identification and/or data code (or RFID tag) on the suspension and following that access, either from a website or internal memory the physical characteristics of the suspension including relevant gas spring dimensions. The camera is programmed to analyze the two images, taken from substantially the same perspective, geometrically and calculate the stroke distance assumed between fully extended "Di" and partially compressed "Dsag" positions. The ratio of Vsag/Vi is equal to the ratio Dsag/Di and therefore the ideal gas equation may be expressed as $PiDi=PsagDsag$. For purposes of an optical embodiment, a known initial pressure Pik must be used but the value is not overly important so long as the observed sag position is not a bottomed out position. With Pik known (as input by the user) and Dsag known (as calculated by the camera), the camera/phone can calculate (using the ideal gas law) a Psag that corresponds to the sprung load and observed sag state. That Psag can then be used in the equation $Pi=Psag \times [1-sag\ fraction]$ to determine a preferred Pi. That Pi is then displayed by the user interface of the camera or camera/phone.

In use the optical embodiment is performed as follows:
1) Data including initial pressure Pik of the gas spring is input into the phone.
2) The phone may query the suspension for an identifying code and may place corresponding suspension data in memory.
3) Using an optical recording device an image is taken of the extended position of the gas spring, Di.
4) The spring is then "loaded" and another image is recorded to establish Dsag.
5) A computer processor calculates the difference between Di and Dsag.
6) Using a known Pik, the processor calculates a Psag.
7) The formula $Pi=Psag \times [1-sag\ fraction]$ is then used to determine a Pi that will result in a preferred Psag.

It is noted that a negative gas spring influence can be calculated also using ideal gas law derivative $P1V1=P2V2$. The initial volume V1 of the negative spring is known as is the volume of the negative spring at sag V2. In one embodiment an iterative solution can be calculated by substituting the foregoing calculated Pi for P1 and solving for P2. The effect of P2 can then be added (based on the negative spring piston area versus the main spring piston area) into the calculation to determine the Psag offset due to the negative spring. A factor such as 10% can be chosen as a delimiter whereby if the effect is greater than the delimiter, the pump computer can recalculate Pi accounting for the effect.

In another embodiment a method of determining a preferred sag can be performed as follows:
1) Hook up pump;
2) set initial shock pressure to a recommended set pressure to establish "datum". In one embodiment, recommended initial pressure will be provided as roughly correlated with rider weight. In the case of a "smart" pump, the information could be stored in the pump processor or simply looked up in a manual that is provided with the suspension system. In yet another embodiment, the information can be "stored" on a decal code or RFID tag located on the shock and readable by a smart phone or other intelligent device. In other instances, an internet link is provided on the decal and takes a user to a site with a page specifically for product set up and details. In one embodiment, identification codes can be scanned that specify details including performance specifications of the suspension components, like gas springs. In one embodiment, the codes and/or data are included on a chip embedded in the suspension. In one embodiment, the chip is an active or passive radio frequency identification ("RFID") (optionally including data) chip. In one embodiment, the smart pump detects the chip and based on the data received, proceeds to determine appropriate sag settings.
3) the pump then audibly or visually tells the rider to take the next step or the rider inputs by some means to the pump that the set pressure is achieved;
4) thereafter, the rider sits, in normal rider position, on the bike and goes through proper sag protocol. The rider may bounce on fork/shock and allow to settle while in normal riding position, etc.;
5) the rider then waits in normal riding position until pump provides audible or visual feedback that it is done taking its measurement. The rider can then dismount;
6) the pump compares Pi to pressure developed under load while rider was in sag position on the bike and calculates a pressure delta; and
7) the pump then compares the pressure delta to stored information about the gas spring and predicts/calculates what travel the spring sagged into when the rider was in the normal riding position.

Questions/queries that are determined by the computer/processor include:
1) Did spring sag to ideal (requires+1−tolerance) sag percentage?
   If "Yes"=pump communicates to rider that the sag is correct and rider removes pump.
   If "No" because there is too little sag, the pump predicts corrected pressure (lower) to achieve ideal sag for the gas spring and the rider manually bleeds air pressure to the pressure communicated by the pump. Thereafter, the rider disconnects the pump.
   If "No" because due to too much sag, the pump communicates a corrected pressure (higher) to achieve ideal sag and the rider manually raises the pressure to the correct value and thereafter, disconnects the pump.

The directly preceding steps and associated apparatus may be used in whole or in part and any suitable combination and further in any suitable combination with any other steps or apparatus included herein.

Proper rebound damping setting often depends on initial spring stiffness (i.e. load) and the spring rate. For example, a higher spring force usually indicates an increase in desired rebound damping to control the return rate of the shock to extension under the force of the spring. When the spring force is lower, a lower rebound damping rate (e.g. force) will be all that is required. The processes described herein ultimately (among other things) result in a properly adjusted initial spring pressure and corresponding spring rate. Because in one embodiment the pump computer has all of the compression spring and sag data it is also, based on the particular suspension model, well equipped to calculate a suggested rebound damping setting corresponding to the preferred initial spring pressure setting. Additionally the pump will "know" (have stored) what product model (by user input or sensor query) it is operating with and will have access to a correlated table for rebound settings versus initial spring pressure and/or final/proper sag. Therefore, in one embodiment, before the rider removes the pump from the gas spring as described, the pump will also communicate (e.g. display) a proper rebound setting (e.g. the number of clicks on a setting dial for proper rebound dampening. In one embodiment the user is directed, following adjustment of the gas spring to proper initial pressure (e.g. from foregoing sag calculations) to "bounce" (cyclically load) the suspension several times. Using a sensor for velocity measurement (or measuring dynamic pressure within the gas spring and calculating velocity based on pressure/volume relationships) the pump or other computing device calculates a rebound velocity occurring during the bouncing and determines whether that velocity is too high or too low for example by comparison with suggested rebound velocities for the given suspension (which was determined by query or input). The device (or user interface such as phone) then, if needed because rebound is incorrect, prompts the user to adjust the rebound adjuster in a certain direction higher or lower such as a dial a certain distance such as for example number of indexing marks or audible clicks.

In addition to rebound dampening, it is also possible for forks or shocks that have adjustable compression damping to make a compression damping adjustment based on final gas spring pressure. This can include another internal computer "look up" table for compression damping setting and final pressure. For example, knowing a weight range of a rider from the prior calculations and knowing if the rider added or subtract air pressure to arrive at a proper sag, the weight of the rider can be predicted and a corresponding suggested compression damping adjustment can be made. In a typical example, a heavier rider would require an increased compression damping setting.

The systems disclosed herein can be fully automatic. If, during the sag setting process for example, the sag is determined to be not great enough (stroke), the pump can be constructed, using for example sensors connected to a controller in turn connected to servo operated valve or valves, to bleed itself down to the proper pressure/sag setting. If this happens dynamically while the rider is on the bike, the bleed mechanism would be very sophisticated (in terms of measuring air exiting the gas spring) in order to "understand" how much (volume of) air it was bleeding off so that it could continue its calculations from a known starting point (i.e. extended gas volume) without excess error. In one embodiment the rider can be instructed by the pump to get off the bike following a bleed down, and the pump would sense a "new" initial set pressure again (e.g. Pi), it would then bleed pressure off to what the rider would have otherwise done manually above.

Figure 8:
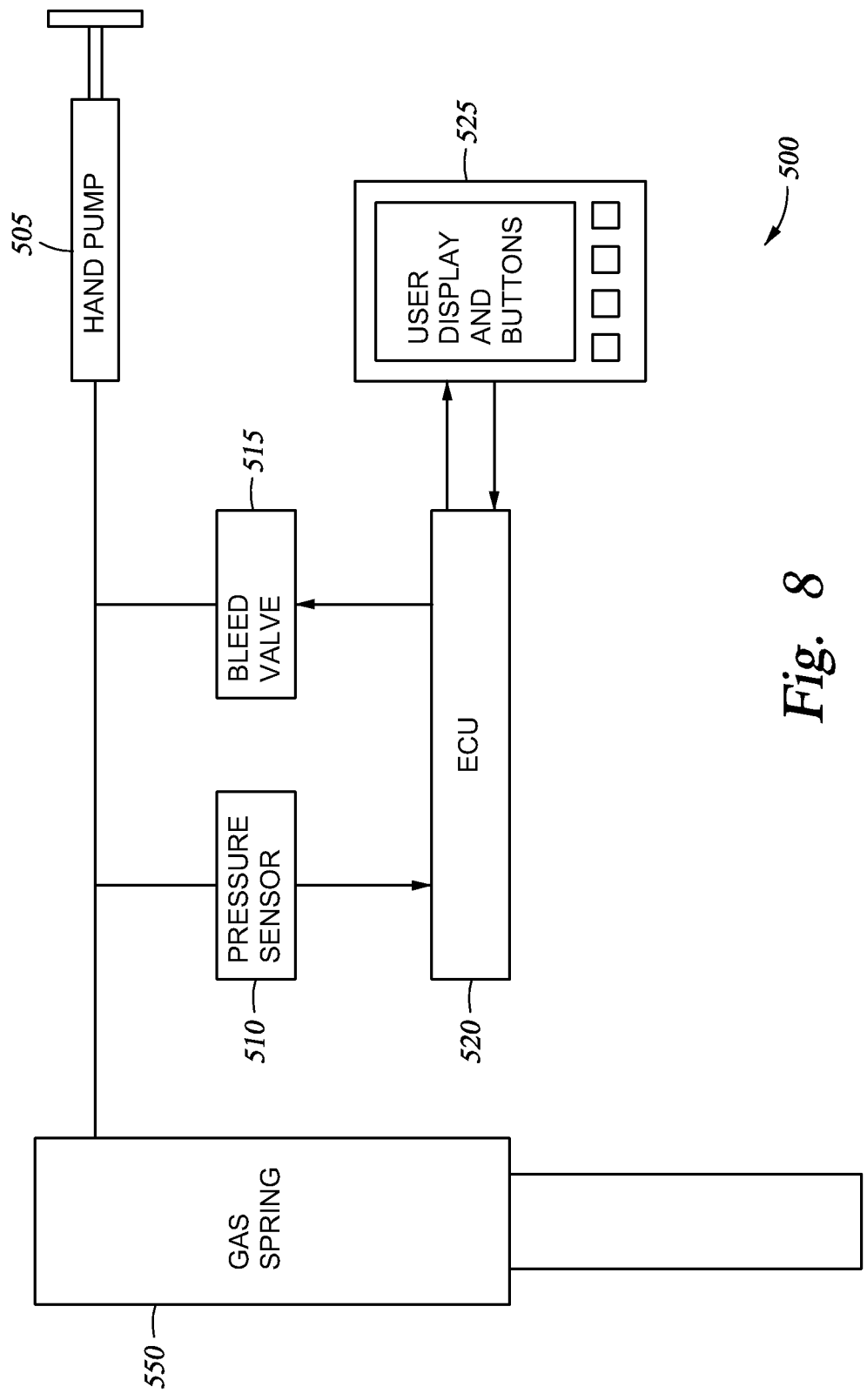
FIG. 8 is a schematic diagram showing a system.

If the sag is too much, the pump, in one embodiment being in communication with a high pressure accumulator/reservoir, would add pressure to the spring to achieve the proper sag. If this is to be done dynamically while the rider is on the bike the pump merely needs to add pressure to find the correct location on the pressure delta versus travel look up table. In one embodiment the rider gets off the bike, and the pump pressurizes the spring to the appropriate pressure FIG. 8 is a schematic view of a system 500 that is primarily electronic. FIG. 8 shows a gas spring along with a hand pump (which could alternatively be electrically powered) having a pressure sensor 510 and a bleed valve 515 integrated therewith. The pump also includes an electronic control/processing unit 520 with memory and a user interface 525 with controls. Further, the processor 520 is connectable to another computer system (not shown) for programming and/or data download or upload or other suitable operations.

In one embodiment, a shock absorber position sensor/calculator and a data processor (to measure compression of the shock from full extension) is used to help maintain proper sag. The position sensor indicates the magnitude (or state) of extension or compression of a shock absorber (like the one in FIG. 2) at any given moment. In one embodiment, a suitable telescopic tube of the shock (like the damper body or the gas spring body, for instance) is equipped or fitted with two piezoelectric sensors. In one embodiment, one of the piezoelectric sensors is a high frequency exciter which is configured on the tube such that it (substantially) continuously induces impacts to a wall of the tube. In lay terms, the sensor thumps or pings the tube wall on a continual basis. In one embodiment, the second piezoelectric sensor is an accelerometer fixed or configured with the tube wall so as to monitor vibration of the tube wall. In one embodiment, the exciter and the monitor are vibration ally isolated so as not to directly influence each other. In one embodiment, the frequency of the exciter is intentionally set well outside any resonant mode of the suspension tube as it travels through its operational suspension stroke. In one embodiment the accelerometer and "thumper" are calibrated with axial travel of the shock absorber so that measured frequency versus position are known. In one embodiment, a sensing frequency of the monitor is selected to coincide (substantially) with at least one resonant mode range of the tube as it travels through its operational stroke. In one embodiment only one accelerometer is used and it measures the "ringing" frequency or frequencies (e.g. natural frequency mode or modes) of the shock absorber as it moves through its travel. The accelerometer has been calibrated to the shock absorber so that the measured resonance is used by the processor (compared to axial travel versus resonance data) to determine axial travel position of the shock absorber.

If the sensor and processor determine that the loaded shock is extended beyond a proper sag level, an electrically actuated valve is opened to bleed air pressure from the gas spring in a controlled manner until the proper predetermined sag level is reached, at which point the valve automatically closes and the pump opts itself out of sag mode. In another embodiment, the position sensor/calculator can include a gas spring pressure sensor and a processor that calculates axial shock position based on the compression ratio of the shock, the pressure of the gas spring, and gas compression laws. Likewise, the data processor can measure compression from full extension or any selectively set "zero" datum.

Alternatively the rider can switch the sag set up mode "off" upon reaching a proper sag setting. In one embodiment, with the pump in normal mode the rider/bike will now be in a proper starting point for their sag measurement. When in "pump" mode, more pressure can be added to the gas spring or pressure can be reduced from the gas spring to accommodate different rider styles and/or terrain. This auto sag feature can be achieved electronically as well, by having a shock position sensor in a computer processor/programming of the pump, and specific shock model data allowing the computer to adjust gas spring preload (e.g. air pressure) appropriately for the given model (in one embodiment as determined by the computer in a query of the shock) what sag measurement it should achieve. An electronically controlled pressure relief valve is utilized to bleed off gas spring pressure until the sensor determines the shock is at its proper sag. The pressure relief valve is then directed to close when proper sag is achieved.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

In another embodiment, a memory in the ECU or an associated external memory includes instructions that cause the processor to perform the calculations described related to calculating pressures, Pi, Psag, Di, Dsag, etc. In another embodiment, instructions are stored on a server computer connected to the internet, the server being configured to receive the measured values from a client computer, compute the suggested operational setting, and transmit the suggested operational setting to the client computer for display.

The foregoing embodiments while shown in configurations corresponding to rear bicycle shock absorbers are equally applicable to bicycle or motorcycle front forks or other vehicle (e.g. 4 wheel) shock absorbers or other shock absorbers generally having or comprising gas springs or rebound dampers.

While the foregoing is directed to embodiments of the present invention, other and further embodiments of the invention may be implemented without departing from the scope of the invention, and the scope thereof is determined by the claims that follow.

The invention claimed is:

1. A shock absorber for a vehicle having a gas spring movable between an extended and compressed positions, comprising
    a gas spring housing;
    a damper body telescopically movable relative to the gas spring housing;
    a trigger, the trigger located on one of the members and operable when the members are in a predetermined position relative to each other;
    a bleed valve for bleeding compressed air from the gas spring as the gas spring housing and damper body move telescopically from the extended to the compressed position, the valve operated by the trigger and the valve initially open and subsequently closed by the trigger;
    a pump for adding compressed air to the gas spring at a first location and for proving compressed air to the bleed valve at a second location; and
    a first and second lock out members to prevent operation of the bleed valve.

2. The shock absorber of claim 1, wherein the first lock out member is a manually operable mode valve constructed and arranged to prevent air from exiting the bleed valve.

3. The shock absorber of claim 1, wherein the trigger is a plunger axially movable in a bleed valve body, the plunger located on the damper body and depressible by contact with the gas spring body.

4. The shock absorber of claim 3, wherein the second lock out member is a retention member preventing extension of the trigger and operation of the bleed valve.

* * * * *